United States Patent
Schneider

(10) Patent No.: US 8,360,182 B2
(45) Date of Patent: Jan. 29, 2013

(54) CONTROL OF THE OPERATING MODE OF A MAIN DRIVE UNIT OF A VEHICLE IN DEPENDENCE ON BRAKE PEDAL ACTUATION

(75) Inventor: Thomas Schneider, Bad Koenigshofen (DE)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 12/684,206

(22) Filed: Jan. 8, 2010

(65) Prior Publication Data

US 2010/0175936 A1    Jul. 15, 2010

(30) Foreign Application Priority Data

Jan. 9, 2009 (DE) .......................... 10 2009 000 111

(51) Int. Cl.
*B60W 10/06* (2006.01)
(52) U.S. Cl. .................... 180/65.28; 123/179.4; 701/112
(58) Field of Classification Search ............. 180/65.265, 180/65.275, 65.28; 701/99, 101, 112, 113; 123/179.3, 179.4
See application file for complete search history.

(56) References Cited

U.S. PATENT DOCUMENTS

| | | | |
|---|---|---|---|
| 6,308,129 B1 * | 10/2001 | Uchida | 701/112 |
| 6,356,042 B1 * | 3/2002 | Kahlon et al. | 318/400.1 |
| 6,885,113 B2 * | 4/2005 | Lim | 290/40 R |
| 7,484,816 B2 * | 2/2009 | Maruyama et al. | 303/191 |
| 7,558,666 B2 * | 7/2009 | DiGonis | 701/112 |
| 7,585,250 B2 * | 9/2009 | Braun et al. | 477/200 |
| 7,681,545 B2 * | 3/2010 | Taki et al. | 123/179.3 |

* cited by examiner

*Primary Examiner* — John Walters
(74) *Attorney, Agent, or Firm* — Kenyon & Kenyon LLP

(57) ABSTRACT

A method for controlling the operating mode of a drive of a vehicle that includes a main drive unit and an auxiliary tractive energy source. The method includes operating the main drive unit, detecting the duration of actuation of an uninterrupted actuation of a brake pedal, and detecting whether the duration of actuation is above a minimum duration by comparing the duration of actuation with a minimum duration. The main drive unit is switched off if it has been detected that the duration of actuation is above the minimum duration. Otherwise, operation of the main drive unit is continued if it has been detected that the duration of actuation is not above the minimum duration. A device for carrying out the method is also described, which includes a timer for detecting the duration of actuation and a comparator for comparing the duration of actuation with a minimum duration.

14 Claims, 1 Drawing Sheet

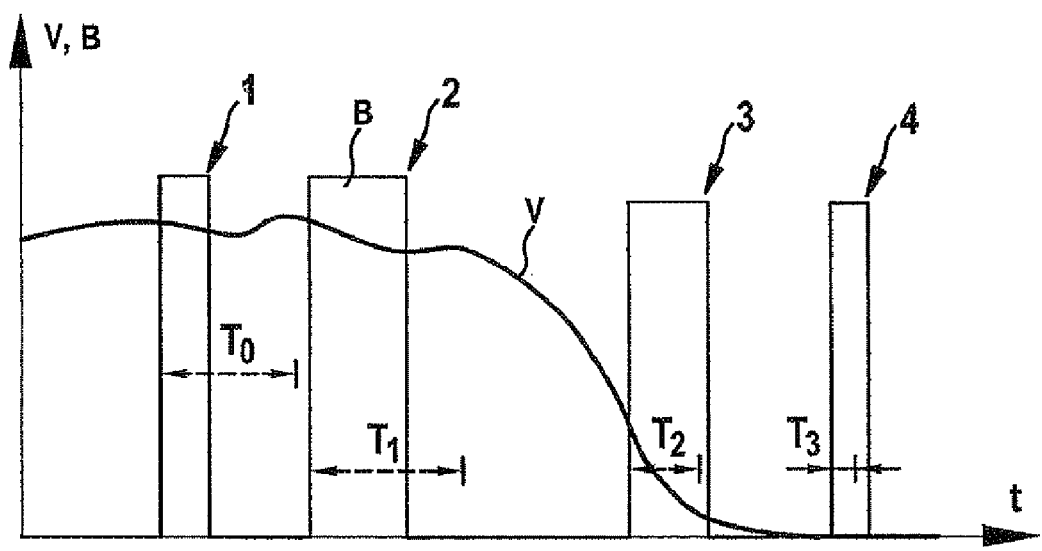

CONTROL OF THE OPERATING MODE OF A MAIN DRIVE UNIT OF A VEHICLE IN DEPENDENCE ON BRAKE PEDAL ACTUATION

CROSS REFERENCE

The present application claims the benefit under 35 U.S.C. §119 of German Patent Application No. 102009000111.5 filed on Jan. 9, 2009, which is expressly incorporated herein in its entirety.

FIELD OF THE INVENTION

The present invention relates to vehicles having a main drive unit and an auxiliary tractive energy source and the operating control thereof. The present invention relates to the control of vehicles having a combination of an internal combustion engine with an electrical temporary storage device, referred to as a hybrid drive, and relates equally to fuel cell-driven vehicles having a fuel cell unit and an electrical temporary storage device.

BACKGROUND INFORMATION

A drive is generally used in vehicles for acceleration and for overcoming air resistance and rolling resistance which occur on acceleration and when driving at constant speed. Due to traffic conditions, therefore, situations arise in which the drive does not contribute to movement of the vehicle, for example when the vehicle is coasting. If an internal combustion engine is used to produce drive, fuel is consumed even when the drive is not producing any motive power. With fuel cell-driven vehicles also, there are situations in which merely the electrical temporary storage device serves as the tractive energy source and, for reasons of operating economy, the fuel cell unit ought to be operated in standby mode.

Conventionally, motor vehicles have been used in which the driver performs all the operations of switching on and off himself/herself, this being done by turning an ignition key or by using an additional button, with which key or button the driver is able to control the operating state of the drive. Automated methods recognize that the engine may be turned off or the fuel cell unit is being put into standby mode from clutch engagement operations in the case of manually shifted transmissions, for example, on the basis of the freewheeling selected. For the fuel cell unit, the standby mode is also referred to as the idle or freewheeling mode. The internal combustion engine or the fuel cell unit is re-started when the clutch is actuated again.

Automatic control of that kind, however, is based on clutch signals which do not occur, for example, in vehicles with automatic transmissions. A problem encountered in the case of automatic control is that, if the internal combustion engine is turned on and off (i.e., started and stopped) infrequently, it runs in situations in which it is possible to dispense with the internal combustion engine, with the result that an unfavorable energy balance is obtained. If, however, the internal combustion engine is switched off and re-started whenever it is under no load, even if only briefly, this results in severe wear to the engine and especially to the starter, which leads to higher maintenance costs and reduced lifetime. This also applies to fuel cell units (in place of the internal combustion engine), which may not be switched on and off (i.e., changed from standby mode to active mode and vice versa) with unlimited frequency without the fuel cell units working inefficiently or, in the long term, being damaged.

Since, in vehicles with automatic transmissions, situations in which the internal combustion engine is to be switched off are not readily distinguishable from situations in which the internal combustion engine should continue to run, it is difficult to optimize the control of the internal combustion engine. In particular, if in the case of automatic transmissions the internal combustion engine is stopped every time the vehicle is stationary and the brake pedal is actuated, this results in a markedly greater strain on the starting system due to the greater number of starting operations. This applies in equal measure to fuel cell-driven vehicles, which by their nature have no gear shifting.

Especially in start/stop systems with automatic transmissions, in hybrid vehicles or in fuel-cell driven vehicles, optimization of the control of the main drive unit is difficult.

SUMMARY

It is an object of the present invention to provide a control mechanism that switches off the main drive unit in suitable situations and at the same time reduces the number of activation operations of the main drive unit (i.e., starting of the internal combustion engine or activation of the fuel cell unit) in normal traffic situations.

The present invention may make it possible for the main drive unit to be controlled in a fuel-saving manner, wherein the number of starts (i.e., activation operations) is not increased and hence expenditure on maintenance and the strain on the drive is reduced. At the same time, it is not necessary for a user to perform manual control activities and, as a result, driving comfort is enhanced and operating errors are avoided. Similarly, incorrect decisions on the part of the user are avoided. At the same time, an embodiment of the present invention may readily be employed in vehicles with automatic transmissions, since clutch signals are not necessary for the control. The main drive unit may be provided in the form of an internal combustion engine or in the form of a fuel cell unit.

In accordance with the present invention, not only the fact of the brake being actuated in itself is detected, but also the duration of actuation of the brake and to use it as a quantity for the control of the main drive unit. In accordance with the present invention, short actuations are distinguished from long-duration actuations, the duration of actuation being an indication of the driving situation according to which the operation of the main drive unit is to be controlled. A long duration of actuation may therefore be readily correlated with a desire to stop for a relatively long period (for example in order to get out of the vehicle), while short actuations are to be correlated with corrections which result from adaptations to traffic flow and in the case of which the main drive unit should not be switched off or go into standby mode. In other words, on the basis of the duration of actuation of the brake it is determined whether the vehicle is actually intended to be brought to a standstill and hence the main drive unit may be switched off or whether what is involved is merely brake actuations that serve to adapt to the traffic flow and that do not indicate that the vehicle is coming to a standstill for a longer period, i.e., is being parked. In accordance with the present invention, therefore, the actuation of a brake pedal is detected, for example by detecting the pressure in the brake circuit or by detecting the degree of actuation using a sensor connected to the brake pedal (or the brake system). In addition, a distinction is made according to an embodiment of the present invention as to whether the actuation is continuous (and hence marks that a longer standstill is to be expected) or whether the actuation is carried out at intervals between which the actuation of the brake pedal is interrupted (as is the case, for example, with short braking maneuvers caused by the traffic flow). For that reason, the uninterrupted actuation of the brake pedal is detected so that, when ascertaining the duration of actuation, a timer or counter is reset if an interruption of the actuation occurs. The duration of actuation may be detected using a timer or using a counter with a fixed counting period or by similar devices.

To assess the duration of actuation, the detected duration of actuation (once the brake pedal has been released again) is compared with a threshold value in the form a minimum duration which, for example, is stored, predetermined or calculated. On the basis of that comparison the internal combustion engine is switched off or the fuel cell unit is put into standby mode if the duration of actuation is above the minimum duration, and operation is continued if it has been detected that the duration of actuation is not above the minimum duration. One of the prerequisites of the example method is an active main drive unit (running internal combustion engine or active fuel cell unit), since an example embodiment of the present invention is concerned with the operation of switching off. In a preferred embodiment, the main drive unit is immediately deactivated (i.e., switched off or put into standby mode) when it has been detected that the duration of actuation is above the minimum duration, i.e., directly following the step of detecting the duration of actuation and hence directly following the end of brake pedal actuation.

The present invention relates to the on/off control of the main drive unit which may be configured as an internal combustion engine or as a fuel cell unit. "Starting" refers to the starting of the internal combustion engine and to the activation of the fuel cell unit so that they are available to provide the drive after starting. "Switching off" refers to the stopping of the internal combustion engine and to the deactivation of the fuel cell unit by putting it into the standby condition. If the main drive unit is switched off, no fuel is supplied to it. If, with the main drive unit switched off, there is a demand for tractive power that is below a threshold value which is predefined or which is monotonically dependent on the state of charge of the auxiliary tractive energy source, then only the auxiliary tractive energy source is used to provide drive, especially at vehicle speeds below a speed limit (e.g., 5 km/h).

In an especially preferred embodiment of the present invention, in addition to actuation of the brake pedal, a further criterion is drawn upon to assess whether the internal combustion engine should be switched off, namely the speed. Accordingly, the speed of the vehicle is preferably detected, with a short minimum duration being provided precisely at low speeds so that at low speeds the system tends to switch off the internal combustion engine also in the case of slightly shorter actuations. In other words, by ascertaining the speed, the traffic situation that the vehicle is in is detected, for example, at high speeds, actuation of the brake pedal is most probably to be associated with adaptation to traffic flow and the situation is not one in which the vehicle may be expected to be stationary for a relatively long period from then on, for example when the vehicle is being parked.

Preferably, the step of switching off the main drive unit is combined with prior checking of the speed, so that the example method switches off the internal combustion engine only when firstly it is established that the duration of actuation is above the minimum actuation and secondly the speed is low, for example below a predefined threshold value. Those two criteria may be combined with each other in such a way that the speed influences the minimum duration used for comparison with the duration of actuation. In order to set the threshold for the duration of actuation to an especially high level in the case of high speeds, the minimum duration is increased with increasing speed. Apart from a continuous increase, the minimum duration may also be set to a very high value if the speed is above a certain threshold value, and may be set to a value that is normally to be attained (for example five seconds) if the speed is below a certain threshold value. Thus, by setting the minimum duration in that manner in dependence on the speed, the switching off according to an embodiment of the present invention is activated below a certain speed; above a certain speed (above a threshold value), the minimum duration is selected to be so high that it is reached only in the case of especially long durations of actuation.

In addition, at least one further criterion may be used for switching off or for ascertaining the minimum duration: the location of the vehicle, the location of the vehicle in relation to a destination, i.e., the distance or the estimated journey time, the power output required, the state of charge of the auxiliary tractive energy source, the energy balance, or the speed of a vehicle that is in front of the vehicle in which the drive is being controlled according to the example embodiment of the present invention. In addition, the type of location is drawn upon (for example an area surrounding a parking garage, it being possible to determine from the proximity to the location, i.e., the proximity to the parking garage, whether the main drive unit is not essential for locomotion) or learned locations at which, on former occasions, the main unit has already been switched off and not switched on again until driving operation has ceased completely. Further types of stopping location are locations behind a traffic jam. If, therefore, on the basis of data from a navigation system, the vehicle is in the vicinity of the destination, behind a traffic jam, at a parking lot and/or in the vicinity of a location at which a low speed or a prompt switching off of the main unit has already occurred formerly, then switching off of the main unit is assisted by reducing the minimum duration. The minimum duration is reduced the more, where applicable in addition to changes based on the vehicle speed, the smaller is the proximity, i.e., the closer the vehicle is, for example, to a programmed-in or learned home location or the closer the vehicle is to a destination entered in the navigation device. Furthermore, the minimum duration is reduced the more (where applicable in addition), the lower is the speed of the person in front or of another vehicle that is travelling in front and which is in car-to-car communication with the vehicle controlled according to the present invention. The speed of the person in front may furthermore be detected by distance-determining devices such as radar. Furthermore, traffic information such as TMC may be used, the minimum duration being reduced the more (where applicable in addition), the greater is the likelihood of a traffic jam up ahead, for example as determined by the navigation device. If, for example, a traffic jam is reported in the vicinity of and on the route of the vehicle, the minimum duration is reduced in order to assist the turning off of the main unit.

In addition, in changing the minimum duration, the electrical energy management or power management may be taken into consideration, for example the total energy management (fuel+stored electrical energy) or the electrical energy management. In this case, the electrical power flows, for example in a fuel cell hybrid vehicle, and the hybrid strategy, i.e., the optimally efficient division of the current power requirement between auxiliary tractive energy source (accumulator) and main drive unit, are taken into consideration have regard to efficiency. For that reason, the minimum duration is additionally lengthened if the energy balance reflects the need to use the main drive unit, and the minimum duration is additionally lengthened if relatively prolonged driving is also possible with auxiliary tractive energy source alone owing to the high state of charge and, where applicable, the positive energy balance. The energy balance includes consumers such as heating system (electrical), headlamps (electrical), air-conditioning system (kinetic drive) and the like.

The input device used is the brake pedal, it also being possible for the input means to be, for example, a joystick or another manual input device. In the case of a joystick or another manual input device, it is also able to reproduce the function of the accelerator pedal, so that a joystick outputs driving and braking signals as outputted by separate accelerator and brake pedals.

In a further embodiment, the speed is drawn upon to control the example method in such a manner that the main drive unit is switched off when the brake pedal is actuated for a certain minimum duration or longer and, at the same time, no negative acceleration occurs. The main drive unit may be switched off at the moment when the minimum duration is exceeded, or may be switched off at the moment when the brake pedal is released if at that moment the minimum duration is or has been exceeded.

Accordingly, the case with a speed of zero (standstill) plays a special role, since actuation of the brake at a standstill (i.e., even though the vehicle is not moving) has a special significance. Since the brake is normally used to reduce the speed and since at a standstill it is not possible to reduce the speed further, actuation of the brake at a speed of zero may only mean that the vehicle has been switched off and parked, since normally the brake is used at a standstill only to arrest the vehicle to avoid undesired rolling. In accordance with one embodiment, therefore, it is detected whether the speed is substantially zero. If that is the case, the minimum duration required to trigger the switching off operation is set to a very small value, so that even brief actuations of the brake pedal result in the main drive unit being switched off. If the speed is too great, the same as or greater than the minimum speed, then the duration of actuation is correlated with a value that increases monotonically with the speed, or is correlated with a predetermined value that is greater than the value at a speed below the minimum speed. As the duration of actuation, it is possible to use values greater than 0.5 second, greater than 1 second, greater than 2 seconds, greater than 4 seconds, greater than 10 seconds, greater than 15 seconds or greater than 20 seconds. In addition, it is possible to use durations of actuation that increase together with the speed according to a linear equation, or it is possible to use individual steps chosen in dependence on the speed. For example, at a speed of substantially zero, the minimum duration may be 0.1 second, at a speed of 0.1-10 km/h 1 second, and at a speed above 10 km/h 20 seconds. Those values are merely examples and are intended to illustrate that the minimum duration may be a step function in dependence on the speed or may in general be a monotonically increasing function or a piecewise monotonic or strictly monotonic function or the like. Other functions are possible, for example a ramp function with one or a plurality of ramp increases, composite functions or the like. An especially simple method of implementation is afforded by a look-up table or another logic providing specific speed intervals with specific constant minimum durations for the respective interval.

The speed signal may be detected by a speed sensor separately provided for the purpose or is preferably provided by already existing speedometers or speed indicators. In principle, it is possible to use a speedometer provided in the vehicle and/or a speed measurement provided by a navigation device. In accordance with one embodiment, the speed is ascertained when the brake pedal is released, i.e., when actuation ends. In a further embodiment, the speed is ascertained when the minimum duration is exceeded. In general, the duration of actuation may be compared with the minimum duration at or after the end of actuation of the brake pedal or during or after exceeding of the minimum duration.

In addition to automatic switching off as provided by the present invention, the example method according to the present invention may also provide for the internal combustion engine or the fuel cell unit to be re-started, the criterion detected being the position of an accelerator pedal. Accordingly, if the beginning of an accelerator pedal actuation is detected, the main drive unit is started preferably immediately. For this, a degree of actuation or a position of the accelerator pedal is detected, similarly to the detection of the brake pedal. In this embodiment, however, as with other embodiments also, detection of further operating parameters is dispensed with. In particular, to carry out the example method according to the present invention, a gear position, for example, is not relevant for switching off of the main drive unit since in automatic transmissions, for example, it is not possible to detect the gear position by reference to the position of a clutch pedal (or a clutch lever) since neither a clutch pedal nor a shift lever is present. In other embodiments, buttons or switches are possible, which are attached, for example, to the instrument panel or to the steering wheel and which detect the operating input of the driver by the pressing of a button. In particular, such input devices are not used in the case of the control according to the present invention, and therefore the switching off of the main drive unit is independent of such inputs. The present invention is preferably implemented using a microprocessor which, for example, may also have other functions, for example driving mode control of a vehicle, the method according to the present invention being provided by software, where appropriate in combination with hardware, with the software running on a microprocessor or microcontroller. In that manner, the example method may be implemented in the form of code which forms part of the program running on the driving mode control. Instead of programmable variants, hardware variants are also possible, in which the steps of comparison and time detection are not performed with the aid of software and internal timing but by individual logic circuits that detect a time duration and output it as a signal or compare that time duration with a minimum duration and output a corresponding signal. The minimum duration may in principle be predetermined. It may, as described above, be dependent on the speed and is then provided, in particular, by a calculating unit, or by a look-up table whose results may, if necessary, be interpolated, or by other methods that calculate the minimum duration, for example, in dependence on the speed. The predetermination of the minimum duration is preferably likewise provided for within the driving mode control in the form of a code segment that implements the respective functions. Furthermore, the minimum duration and the look-up table may also be provided within a memory, for example within a working memory that is in contact with a processor.

The example device according to the present invention therefore includes an input with which a signal representing the degree of actuation or the position of the brake pedal may be detected. The signal may be an analog or digital signal or a pulse-width modulated signal, with digital signals of fixed word length preferably being used. Such signals may be transmitted in the conventional manner over a CAN bus or LIN bus. In addition to the input, the device preferably includes a control output which is connected to the main drive unit or its control in order for the main drive unit to be switched off where appropriate (or started). The device further includes a time standard, for example a counter with a fixed timing which advances a counter by a fixed increment in every clock cycle. The time duration signal outputted by the time standard corresponds to the duration of uninterrupted actuation of the brake pedal and is likewise in analog or digital form, preferably in the form of a digital word in binary form with a fixed word length. For example, when a digital counter is used, the time duration signal corresponds to the counter reading. The time standard may be an additional timer or may correspond to a clock generator of a processor on which software runs. In that case, part of the software implements the example method according to the present invention. The time standard is preferably connected to the input, for example via a conventional data bus or via other lines.

In addition, the example device preferably includes a comparator which is connected to the timekeeper, for example in the form of a bus, in the form of lines or, in the case of software implementation, in the form of a memory in which the time standard stores a value and the comparator reads out that value. The comparator compares the time duration signal with a minimum duration which is called up from a memory or which is provided by a calculating device. As with other components, the calculating device may be provided by code running on a common processor. The output of the comparator in the form of the comparison result may similarly be outputted as a digital or analog signal or is preferably a digital value of a fixed word length which is written to a memory.

The example device preferably also includes a control output which outputs a signal corresponding to the comparison result. The control output therefore outputs an off signal when the comparison result indicates a time duration signal greater than or equal to the minimum duration, the off signal being transmitted to the main drive unit in order for the content of the signal to be implemented.

In order also to take account of the speed, as described above, a speed input is provided which detects the speed of the vehicle. In the case of software-based implementation, the speed input corresponds to a port which is addressed or to a memory cell in which a digital value corresponding to the speed is stored. In dependence on the speed the minimum duration is then calculated or read from a look-up table, with a calculating unit assuming that function. The calculating unit may similarly be a code segment that runs on the processor and which determines the minimum duration according to the speed. As already mentioned, at high speeds, switching off according to the present invention is suppressed by specifying especially high minimum durations which normally are not reached or are reached only in the case of especially long actuation durations. Switching off of the main drive unit in accordance with the present invention accordingly takes place primarily at low speeds, whereas at high speeds the threshold is markedly raised in comparison with low speeds or the threshold is raised in such a way that the minimum duration cannot be reached, for example when the minimum duration is selected to be greater than a value attained at maximum by a counter providing the time standard.

The example device may further include a logic that detects an end of the actuation of the brake pedal and activates the calculating unit to cause it to correlate a speed with the minimum duration on the basis of a trigger signal outputted by the logic. A logic of that kind may be hard-wired or is preferably stored as a look-up table in a memory.

BRIEF DESCRIPTION OF THE DRAWINGS

An exemplary embodiment of the present invention is illustrated in the FIGURE and is described below.

FIG. 1 shows an example of the plot of the speed and an actuating signal.

DETAILED DESCRIPTION OF EXAMPLE EMBODIMENTS

FIG. 1 shows an example of the plot of the speed and of degrees of actuation which in their variation with time are compared with switching off steps according to an example embodiment of the present invention.

The curve B illustrates degrees of actuation, FIG. 1 differentiating only between non-actuation and actuation and thus the degrees of actuation exhibiting two different levels. In accordance with other embodiments, the degrees of actuation may be used according to the brake cable or the position of the brake pedal, for example also as an integral over the braking pressure, so that particularly intense actuations are also of greater consequence and are rated as longer durations of actuation than actuations with little braking pressure. At time 1, the first actuation has ended, and therefore the duration of actuation may be calculated as the distance between the edges of the rectangular curve whose trailing edge is marked 1. The duration of actuation of that first actuation is relatively short and, in particular, is shorter than the minimum duration $T_0$. At time 1, therefore, operation of the main drive unit is continued. The minimum duration $T_0$ is dependent in FIG. 1 on the speed v, which at time 1 is relatively high.

Similarly, the speed during the second actuation, which has ended at time 2, is relatively high. At time 2, therefore, the duration of actuation (the width) of the second rectangle is compared with the relevant minimum duration $T_1$ which is as great as $T_0$ since the speed during the second actuation substantially corresponds to the speed during the first actuation. Furthermore, during the first two actuations and on the basis of the speed curve obtained during those actuations, it will be seen that the braking operations have led merely to a slightly reduced speed, but not to a standstill, and therefore it is clear that, following actuation of the brake, driving with the main drive unit is to be continued. Curves of the kind illustrated in FIG. 1 are obtained, for example, on adapting speed in relatively heavy traffic, and therefore the first two brake actuations serve merely to adapt the speed and are not suitable for bringing the vehicle to a prolonged standstill.

The third actuation, which ends with time 3, takes place at a distinctly lower speed, and therefore the minimum duration $T_2$ is also shorter than the minimum durations $T_0$ and $T_1$. At time 3, therefore, the main drive unit is switched off, since the length of the third braking operation is longer than the minimum duration $T_2$. In an alternative embodiment, the main drive unit is already switched off at the end of the minimum duration $T_2$ since the condition that the brake pedal is still being pressed at that time and the brake pedal has been actuated over the entire minimum duration is satisfied. It is clear from FIG. 1, in particular, that the residual speed at the end of the actuation is used to calculate the minimum duration, since it is possible to infer, in particular, from the residual speed whether the vehicle is to be turned off or whether it is merely to continue travelling at a slightly reduced speed. In one embodiment, turning off according to the present invention is carried out only when the speed of the vehicle is below a predefined minimum value, using for comparison the speed of the vehicle during actuation of the brake pedal, at the beginning of actuation, at the end of actuation or at the end of the minimum duration. Above the minimum value, automatic turning off of the main unit in accordance with the present invention is suppressed or is not carried out. For example, switching off according to the present invention is suppressed at speeds above the minimum value by giving a very high value to the minimum duration, for example a maximum representable digital value of a digital signal of fixed word length, or a value that cannot be reached by a counter, for example −1 in the case of a timing counter which can only provide values greater than or equal to zero. This applies especially to embodiments implemented with digital logic or by software.

From the beginning of $T_2$, the vehicle coasts, i.e., with the beginning of the braking period that ends at time 3. During $T_2$ and also after the end of $T_2$ and after the time 3, the vehicle is coasting or is being moved only very slowly, for example during a parking maneuver. The movement may, where appropriate, be assisted by the auxiliary tractive energy source which is activated by (light) actuation of the accelerator pedal to provide drive. The auxiliary tractive energy source is preferably an electrical accumulator, for example a supercap, a lead storage battery or a lithium-based electrical storage battery. So as not to switch on the main unit unnecessarily during the maneuver at low speed, on light actuation of the accelerator pedal only the auxiliary tractive energy source is connected, whereas the main unit remains switched off. The light actuation of the accelerator pedal is ascertained by detecting the pressure, acceleration or (maximum) degree of actuation (for example the adjustment angle) of the accelerator pedal which the driver is actuating. A more intense actuation (above a defined actuating pressure threshold, above a defined actuation acceleration threshold or above a defined (maximum) degree of actuation threshold) results in the main unit being switched on. The threshold in question may be made dependent on the state of charge of the auxiliary tractive energy source; the lower is the state of charge of the auxiliary tractive energy source, the lower is the threshold, and conversely the greater is the state of charge of the auxiliary tractive energy source, the higher is the threshold. Alternatively, the threshold may be predefined.

For the purpose of illustration, it is assumed in the following that, after time 3, the main unit is still active even though, as described, at time 3 or at the end of $T_2$ the main unit is turned off. The consideration of time 4 and of $T_2$ is therefore to be regarded separately from the preceding braking situation and serves to describe the present invention for situations with a very low driving speed or no driving speed.

Whereas the third brake actuation in FIG. 1 corresponds to braking to a stop, the fourth braking operation may be based on a parking situation, i.e., between the third and fourth braking operations, maneuvers at low speed (for example for parking) are being carried, and the fourth brake actuation serves to switch off the vehicle since the brake is actuated at a speed of substantially zero. Since the speed during the fourth braking operation is very low (substantially zero), the minimum duration $T_3$ is very low, it also being possible for distinctly lower values to be correlated with the minimum duration $T_3$ so that merely tapping the brake pedal results in the main drive unit being turned off. At time 4, the end of the actuation of the brake pedal is detected and the main drive unit is switched off. In an alternative embodiment, the exceeding of the minimum duration by the duration of actuation, i.e., at the end of $T_2$ or at the end of $T_3$, is already used for the decision to switch off the main drive unit, with the result that the switching off operation is not carried out with the end of the actuation of the brake pedal, but is already carried out when the minimum duration is exceeded, i.e., with the end of the minimum duration $T_2$, $T_3$. In that case, switching off of the main drive unit is not carried out or initiated at times 3, 4 (downward edges of the degree of actuation curve), but the running of the counter from $T_2$ and $T_3$ already leads to initiation of the switching off operation or to the immediate switching off of the main drive unit. In accordance with a further embodiment, the main drive unit is not switched off immediately at the above-mentioned times, but only after a waiting period during which, for example, actuation of the accelerator pedal stops the switching off operation and revises it.

The example method described above and the device described above may generally be used for the control of drives that include an internal combustion engine or main drive unit, since, for example, if an electric motor supplied by electrical accumulators is used, other key values apply and the start/stop operation does not lead to problems such as those encountered in the case of internal combustion engines. This, however, is dependent on the load capacity of the electrical accumulators. The example method may be used in vehicles with an automatic start/stop system, in which relatively short pauses in which the drive is not under load also lead to the internal combustion engine being turned off. In general, the example method may be applied to drive technologies in which an internal combustion engine (or a fuel cell unit) may also be switched on and off automatically in addition to being switched off manually. Suitable types of drive are any drives with an internal combustion engine, types of drive with an internal combustion engine and an electric motor which may be combined to produce drive, for example hybrids with electric auxiliary motor, with serial hybrid technology or parallel hybrid technology. Especially suitable types of drive are those based on fuel cells, above all types of drive that have an auxiliary tractive energy source as a secondary energy source, that are robust with respect to frequently changing load or with respect to frequent switching on and off, for example capacitors or electrical accumulators.

What is claimed is:

1. A method for controlling an operating mode of a drive of a vehicle that includes a main drive unit and an auxiliary tractive energy source, the method comprising:
operating the main drive unit;
detecting a duration of actuation of an uninterrupted actuation of a brake pedal;
detecting whether the duration of actuation is above a minimum duration by comparing the duration of actuation with a minimum duration;
switching off the main drive unit if it has been detected that the duration of actuation is above the minimum duration; and
continuing operation of the main drive unit if it has been detected that the duration of actuation is not above the minimum duration.

2. The method as recited in claim 1, further comprising: ascertaining a speed of the vehicle, wherein at low speeds, a lower minimum duration is provided than at high speeds.

3. The method as recited in claim 2, wherein at least one of: i) the minimum duration reduces with decreasing speed, and ii) the minimum duration increases at least piecewise monotonically or strictly monotonically with the speed.

4. The method as recited in claim 2, wherein the minimum duration at a speed of substantially zero or at a speed below a predetermined minimum speed is substantially zero and the minimum duration at a speed that is at least as great as the minimum speed one of: i) is constant, ii) increases monotonically with the speed, iii) is greater than 0.5 s, iv) is greater than 1 s, v) is greater than 2 s, vi) is greater than 4 s, vii) is greater than 10 s, viii) is greater than 15 s, or ix) is greater than 20 s.

5. The method as recited in claim 2, wherein the speed is ascertained one of: i) when it is detected that the actuation of the brake pedal has ended, ii) when it is detected that the actuation of the brake pedal begins, or iii) when the minimum duration ends.

6. The method as recited in claim 1, further comprising: detecting a position of an accelerator pedal and if, in accordance with the switching off step, the main drive unit is not in operation, the main drive unit is started if the position corresponds to an actuation of the accelerator pedal.

7. The method as recited in claim 1, wherein the operating state of the main drive unit is independent of i) gear positions, or ii) a user input that serves exclusively to control the operation of the main drive unit.

8. The method as recited in claim 1, further comprising:
ascertaining a speed of the vehicle, wherein at low speeds, a lower minimum duration is provided than at high speeds; and
detecting a position of an accelerator pedal and if, in accordance with the switching off step, the main drive unit is not in operation, the main drive unit is started if the position corresponds to an actuation of the accelerator pedal;
wherein the operating state of the main drive unit is independent of i) gear positions, or ii) a user input that serves exclusively to control the operation of the main drive unit.

9. The method as recited in claim 8, wherein at least one of: i) the minimum duration reduces with decreasing speed, and ii) the minimum duration increases at least piecewise monotonically or strictly monotonically with the speed.

10. The method as recited in claim 8, wherein the minimum duration at a speed of substantially zero or at a speed below a predetermined minimum speed is substantially zero and the minimum duration at a speed that is at least as great as the minimum speed one of: i) is constant, ii) increases monotonically with the speed, iii) is greater than 0.5 s, iv) is greater than 1 s, v) is greater than 2 s, vi) is greater than 4 s, vii) is greater than 10 s, viii) is greater than 15 s, or ix) is greater than 20 s.

11. The method as recited in claim 8, wherein the speed is ascertained one of: i) when it is detected that the actuation of the brake pedal has ended, ii) when it is detected that the actuation of the brake pedal begins, or iii) when the minimum duration ends.

12. A device for controlling a main drive unit of a drive of a vehicle, wherein the drive includes the main drive unit and an auxiliary tractive energy source as the drive unit of the vehicle, the device comprising:
an input for detecting a degree of actuation of a brake pedal;
a time standard which is connected to the input and is adapted to detect a duration of actuation of an uninterrupted actuation of the brake pedal on the basis of the detected degree of actuation and to output a time duration signal corresponding to the duration of actuation;
a comparator which is connected to the time standard and is adapted to compare the time duration signal with a minimum duration present at an input of the device or in a memory of the control and to output a comparison result; and
a control output which is adapted for activation and connection to the main drive unit and which outputs an off signal if the comparison result indicates a time duration signal that is greater than the minimum duration and which outputs an on signal or no off signal if the comparison result indicates a time duration signal that is not greater than the minimum duration.

13. The device as recited in claim 12, further comprising:
a speed input adapted to receive a signal representing a speed from a speed sensor for detecting a speed of the vehicle and transmit it to a calculating unit of the device, the calculating unit adapted to correlate with the detected speed the minimum duration which reduces with decreasing speed.

14. The device as recited in claim 13, further comprising:
a logic which is connected to the input and is adapted to determine an end of the actuation on the basis of the detected degree of actuation and which is connected to the calculating unit in order to transmit to the calculating unit when the end of the actuation occurs a trigger signal which causes the calculating unit to carry out the correlation between speed and minimum duration.

\* \* \* \* \*